(12) United States Patent
Nath

(10) Patent No.: US 8,959,253 B2
(45) Date of Patent: Feb. 17, 2015

(54) VIRTUALIZING A POWERED DOWN INPUT/OUTPUT DEVICE

(75) Inventor: Siddhartha Nath, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/942,776

(22) Filed: Nov. 9, 2010

(65) Prior Publication Data

US 2011/0153872 A1 Jun. 23, 2011

(51) Int. Cl.
*G06F 3/00* (2006.01)
*G06F 9/50* (2006.01)
*G06F 9/455* (2006.01)
*G06F 9/44* (2006.01)
*G06F 1/32* (2006.01)

(52) U.S. Cl.
CPC *G06F 9/50* (2013.01); *G06F 9/455* (2013.01); *G06F 9/4411* (2013.01); *G06F 9/4418* (2013.01); *G06F 1/3206* (2013.01)
USPC ............................................... 710/10; 710/8

(58) Field of Classification Search
None
See application file for complete search history.

(56) References Cited

U.S. PATENT DOCUMENTS

| | | | |
|---|---|---|---|
| 2003/0188074 A1 | 10/2003 | Bronson et al. | |
| 2007/0019637 A1* | 1/2007 | Boyd et al. | 370/360 |
| 2008/0117909 A1 | 5/2008 | Johnson | |
| 2009/0113430 A1* | 4/2009 | Riley | 718/101 |
| 2009/0119684 A1* | 5/2009 | Mahalingam et al. | 719/324 |
| 2009/0187694 A1* | 7/2009 | Baba et al. | 710/316 |
| 2009/0319604 A1* | 12/2009 | Hatasaki et al. | 709/203 |
| 2010/0146160 A1* | 6/2010 | Piekarski | 710/28 |
| 2011/0029694 A1* | 2/2011 | Blinzer | 710/9 |

FOREIGN PATENT DOCUMENTS

| CN | 88100762 A | 11/1988 |
|---|---|---|
| CN | 1522415 A | 8/2004 |

OTHER PUBLICATIONS

Office Action received for German for Patent Application No. 10 2010 054 774.3, mailed on Aug. 17, 2011, 5 pages of Office Action and 4 pages of English Translation.
"Intel® 925X Express Chipset", Datasheet for the Intel® 82925X Memory Controller Hub (MCH), Aug. 2004, Document No. 301464-002, 243 pages.
Office Action received for Chinese Patent Application No. 201010625037.5, mailed on Apr. 26, 2013, 9 pages of Chinese Office Action and 23 pages of English Translation.
Office Action Received for Chinese Patent Application No. 201010625037.5, mailed on Jan. 30, 2014, 7 Pages of Chinese Office Action and 17 Pages of English Translation.

* cited by examiner

*Primary Examiner* — Kris Rhu
(74) *Attorney, Agent, or Firm* — Thomas R. Lane

(57) ABSTRACT

Embodiments of systems, apparatuses, and methods for virtualizing a powered-down input/output device are disclosed. In one embodiment, an apparatus includes a storage location and a decoder. The storage location is to store an indication that an input/output device is inaccessible. The decoder is to decode a configuration transaction directed to the input/output device and redirect the configuration transaction to another target if the contents of the first storage location indicate that the input/output device is inaccessible.

6 Claims, 5 Drawing Sheets

METHOD 500

VIRTUALIZING A POWERED DOWN INPUT/OUTPUT DEVICE

RELATED APPLICATION

This application is related and claims the benefit of Indian Patent Application serial Number 2697/DEL/2009, entitled "VIRTUALIZING A POWERED-DOWN INPUT/OUTPUT DEVICE" inventor Siddhartha Nath, filed Dec. 23, 2009 (attorney docket number P30082IN).

BACKGROUND

1. Field

The present disclosure pertains to the field of information processing, and more particularly, to the field of virtualization in information processing systems.

2. Description of Related Art

Many personal computer and other information processing systems support a "plug and play" feature that allows the addition of input/output ("I/O") devices to the system to be automatically detected and enabled for use, in many cases while the system in powered on. Another feature of many such systems is the power-saving feature of automatically or selectively putting parts of the system, such as I/O devices, into a low-power or powered-down state after a certain period of non-use.

BRIEF DESCRIPTION OF THE FIGURES

The present invention is illustrated by way of example and not limitation in the accompanying figures.

DETAILED DESCRIPTION

Embodiments of systems, apparatuses, and methods, for virtualizing an input/output device are described. In this description, numerous specific details, such as component and system configurations, may be set forth in order to provide a more thorough understanding of the present invention. It will be appreciated, however, by one skilled in the art, that the invention may be practiced without such specific details. Additionally, some well known structures, circuits, and the like have not been shown in detail, to avoid unnecessarily obscuring the present invention.

Embodiments of the present invention provide for virtualizing an I/O device in an information processing system, such that the device may be switched between different power states with less delay. For example, an embodiment provides for a discrete graphics controller to be virtualized such that the time required to start using it again after it has been powered down may be significantly reduced. Therefore, embodiments of the present invention may be desirable to provide a more satisfactory user experience, along with a greater likelihood that power-saving features will be used more often.

Figure 1:
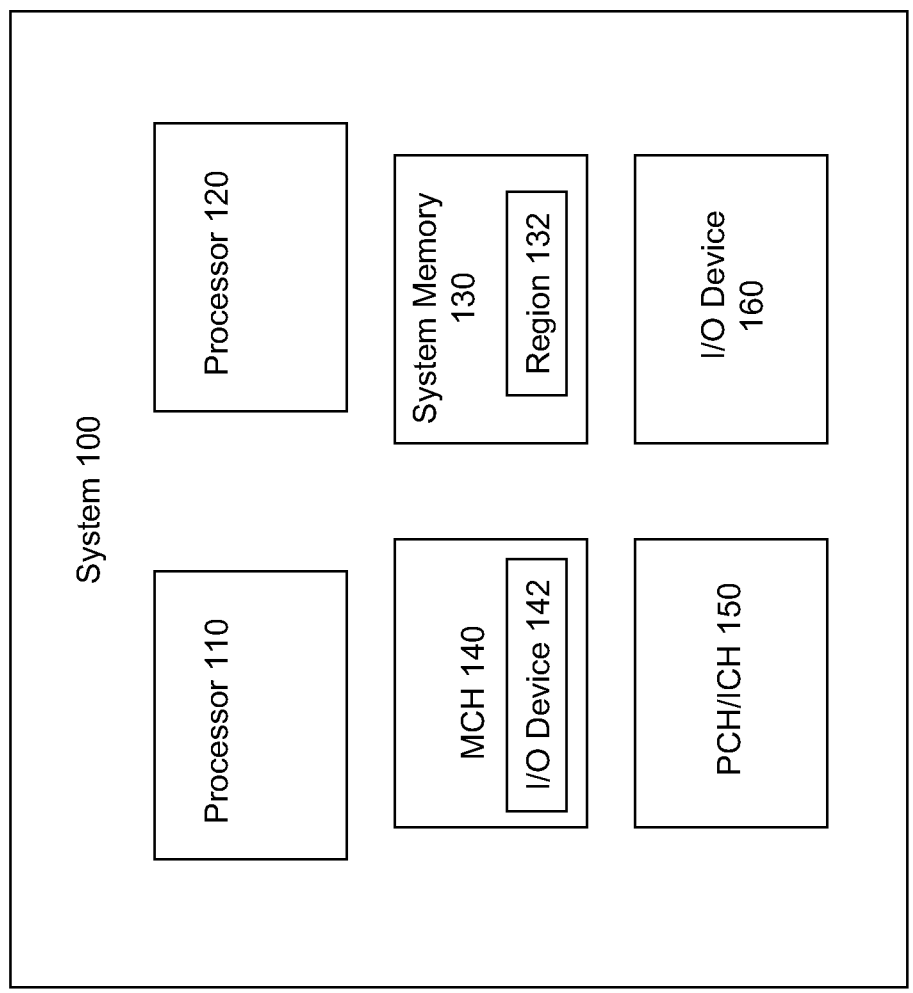
FIG. 1 illustrates a system including virtualization of an I/O device according to an embodiment of the present invention.

FIG. 1 illustrates an embodiment of the present invention in a system, specifically information processing system 100. Information processing system 100 may be any information processing apparatus capable of executing any software or firmware. For example, information processing system 100 may represent a personal computer, a mainframe computer, a portable computer, a handheld device, a set-top box, a server, or any other computing system. Information processing system 100 includes processors 110 and 120, system memory 130, memory control hub ("MCH") 140, peripheral controller hub ("PCH") or I/O control hub ("ICH") 150, and I/O device 160. Processors 110 and 120, system memory 130, MCH 140, ICH 150, and I/O device 160 may be coupled to or communicate with each other according to any known approach, such as directly or indirectly through one or more buses, point-to-point, or other wired or wireless connections. Information processing system 100 may also include any number of additional components or connections. Furthermore, the components in information processing system 100 may be integrated or combined into any number of chips or packages. For example, MCH 140 may be integrated into a chip or package including one or both of processors 110 and 120.

Processors 110 and 120 may be any type of processor, including a general purpose microprocessor, such as a processor in the Intel® Pentium® Processor Family, Itanium® Processor Family, Core® Processor Family or other processor family from Intel® Corporation, or another processor from another company, or a digital signal processor or microcontroller. Processors 110 and 120 may each include multiple threads and multiple execution cores, in any combination. Although FIG. 1 shows two processors, information processing system 100 may include only a single processor or any number of processors.

System memory 130 may be static or dynamic random access memory, or any other type of medium readable by processors 110 and 120, or any combination of such mediums. System memory 130 may include memory region 132, as described below.

MCH 140 may include any logic, circuitry, or other hardware to control the transfer of information between system memory 130 and any other component in information processing system 100, such as processors 110 and 120. MCH 140 may also include any other logic, circuitry, or other hardware to perform any other functions, such as passing and/or translating transactions and/or other communications between ICH 150 and processors 110 and 120 and system memory 130.

ICH 150 may include logic, circuitry, or other hardware to manage system logic, peripherals, and I/O devices in information processing system 100, which may be integrated into ICH 150 and/or may communicate with ICH 150, and to control the transfer of information between these devices and any other component in information processing system 100, such processors 110 and 120 and system memory 130. ICH 150 may also include any other logic, circuitry, or other hardware to perform any other functions, such as passing and/or translating transactions and/or other communications between MCH 140 and any peripherals, I/O devices, or other components in information processing system 100.

I/O device 160 may represent any I/O or peripheral device and/or a controller or adapter for any such device. I/O device 160 may be integrated into or separate from ICH 150. In one embodiment, I/O device 160 may be a discrete graphics controller which is separate from ICH 150. In an other embodiment, I/O device 160 may be a discrete audio controller.

Returning to MCH 140, MCH 140 may include downstream I/O device 142, which may represent any I/O or peripheral device and/or a controller or adapter for any such device. Downstream I/O device 142 may be a device that may perform a function that is similar to or a substitute for the function performed by I/O device 160. Furthermore, downstream I/O device 142 may perform that function with lower power consumption, but also with lower performance. For example, in an embodiment wherein I/O device 160 is a discrete graphics controller, downstream I/O device 142 may be an integrated graphics controller, integrated into MCH 140, ICH 150, or any other component or chipset. In this embodiment, discrete graphics controller 160 may offer better performance than integrated graphics controller 142, but with higher power consumption. Therefore, when running an application on system 100 that does not require or benefit significantly from a high-performance graphics controller, it may be desirable to power down discrete graphics controller 160 and use integrated graphics controller 142 instead.

Figure 2:
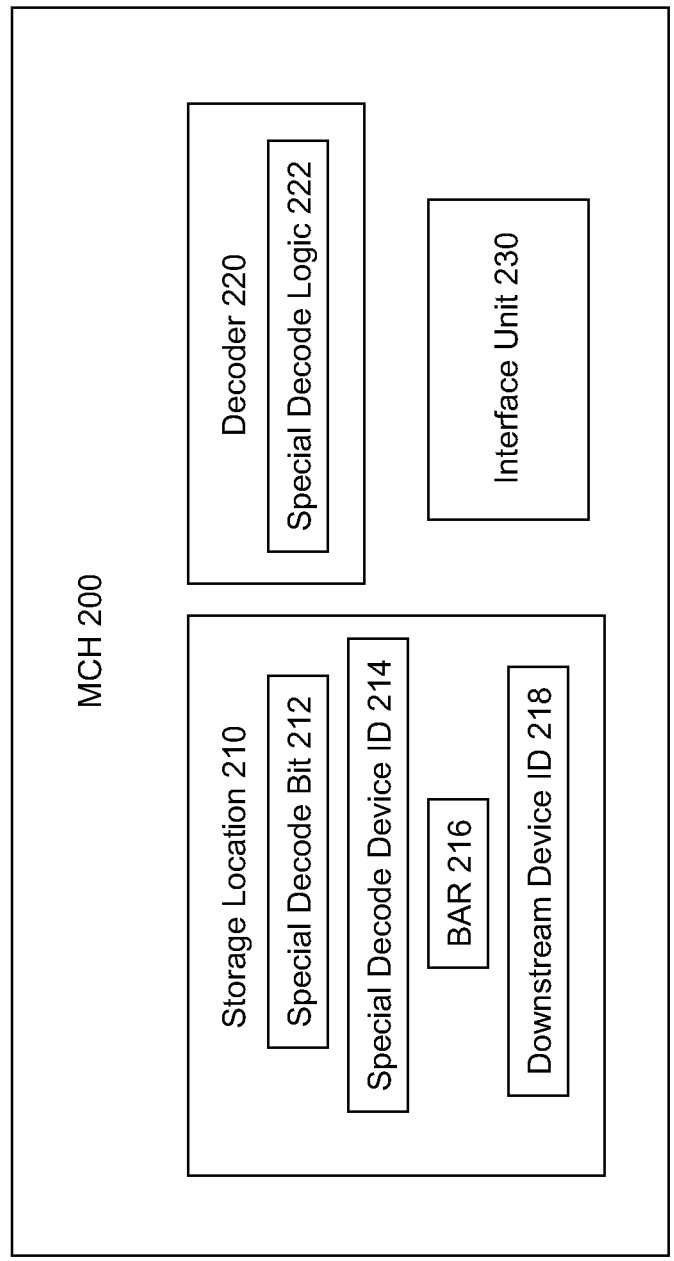
FIG. 2 illustrates an apparatus for virtualizing an I/O device according to an embodiment of the present invention.

FIG. 2 illustrates an embodiment of the present invention in an apparatus, specifically MCH 200, which may correspond to MCH 140 in FIG. 1. MCH 200 may include storage location 210, decoder 220, and interface unit 230.

Storage location 210 may include a number of storage locations of different sizes and for different purposes in accordance with embodiments of the present invention, as described below. Each of these storage locations may be a register or any other storage location to store one or more bits of information. In an embodiment wherein components communicate with each other through transactions according to the Peripheral Component Interconnect ("PCI") or PCI Express specification, one or more of these storage locations may be within PCI configuration space registers in MCH 200. One or more instances of each different storage location described herein may be used in embodiments of the present invention; for example, there may be one instance of each different storage space for each device that may be virtualized according to an embodiment of the present invention. Furthermore, any or all of these storage locations may be located in a component other than MCH 200 in other embodiments of the present invention.

Special decode storage locations 212 and 214 may be used to store an indication of whether a special decode as described herein is enabled for a device. In one embodiment, special decode storage locations 212 and 214 may together form an eight-bit register, wherein storage location 212 corresponds to the lowest bit location ("bit 0") of the register and may be set to a value of one to indicate that special decode is enabled and cleared to a value of zero to indicate that special decode is not enabled. This bit may be referred to as special decode bit 212. Special decode storage location 214 may correspond to the remaining seven bit locations of the eight-bit register may be used to store an identifier of the device to be virtualized, for example, bits 2 and 1 may be used for the bus identifier, bits 4 and 3 may be used for the device identifier, and bits 7, 6, and 5 may be used for the function identifier, according to the PCI bus, device, function ("BDF") identification system. These bits may be referred to as special decode device ID 214. In this embodiment, special decode device ID 214 may be programmed with the BDF of I/O device 160.

Base address storage location 216 may be used to store information, for example a base address, of memory region 132 where configuration information for a virtualized device may be stored. The term "configuration information" for a device refers to the information that is stored in the configuration space of an I/O device, including information related to the identity and the initialization of the device, such that system software such as an operating system or a virtual machine monitor may identify and initialize the device. For example, the configuration space may store information that an operating system may use to discover the device, allocate memory, I/O, and interrupt resources for it, such that a user of system 100 may use the device through its device driver and the operating system. In one embodiment, the configuration information may be used to support a plug and play ("PnP") feature in system 100.

In one embodiment, base address storage location 216 may be a base address register ("BAR") to store the base address of memory region 132. The size of memory region 132 may be different in different embodiments of the present invention, and the size may be fixed in some embodiments and variable in other embodiments. In an embodiment where I/O device 160 is a PCI device, the size may be 256 bytes. In an embodiment where I/O device 160 is a PCI Express device, the size may be 4 kilobytes. Therefore, the size of the memory region defined by BAR 216 may be large enough to store at least a portion of the PCI or PCI Express configuration information for I/O device 160. For example, memory region 132 may be the size of the region of configuration space of a PCI or PCI Express device that is read by an operating system to discover the device for a PnP feature. This particular region of configuration space of a device may be referred to herein as the PnP configuration space.

Downstream device storage location 218 may be used to store information used to identify a device designated to store configuration information for a virtualized device. For example, downstream I/O device 142 may be designated to store configuration information for I/O device 160 when I/O device 160 is virtualized according to an embodiment of the present invention. Therefore, the BDF of downstream I/O device 142 may be stored the downstream device storage location 218.

Decoder 220 may include any logic, circuitry, or other hardware to decode addresses included in transactions between components in system 100, along with transaction type ("e.g., memory, I/O, or configuration"). Decoder may include special decode logic 222 to redirect certain transactions intended for I/O device 160 to a different target. In one embodiment, special decode logic 222 may operate as follows. While special decode bit 212 has a value of zero, special decode logic 222 may recognize transactions intended for the PnP configuration space of I/O device 160 and direct them to I/O device 160. However, while special decode bit 212 has a value of one, special decode logic 222 may recognize transactions intended for the PnP configuration space of I/O device 160 and direct them to memory region 132. Therefore, the transaction data may be stored in or retrieved from memory region 132 instead of I/O device 160. In another embodiment, special decode logic 222 may operate as follows. While special decode bit 212 has a value of zero, special decode logic 222 may recognize transactions intended for the PnP configuration space of I/O device 160 and direct them to I/O device 160. However, while special decode bit 242 has a value of one, special decode logic 222 may recognize transactions intended for the PnP configuration space of I/O device 160 and direct them to downstream I/O device 142. Therefore, the transaction data may be stored in or retrieved from downstream I/O device 142 instead of I/O device 160. Decoder 220 and/or special decode logic 222, although within MCH 200 in the embodiment of the present invention shown in FIG. 2, may be separate from MCH 200 in other embodiments.

Interface unit 230 may include any logic, circuitry, or other hardware to transfer signals to and from MCH 200 and/or to and from functional units or other structures within MCH 200. Therefore, interface unit 230 may include or may support any number of input pins, output pins, bidirectional pins, and/or internal signal lines, along with associated circuitry.

Within the scope of the present invention, MCH 200 may include some or all of the features illustrated in FIG. 2, and may include any additional features desired. Furthermore, any of the illustrated and/or other logic, circuitry, or other hardware may be included in, omitted from, and/or arranged in MCH 200 according to any approach. Additionally, features illustrated within MCH 200 in FIG. 2 may be separate from MCH 200 in other embodiments of the present invention.

Figure 3:
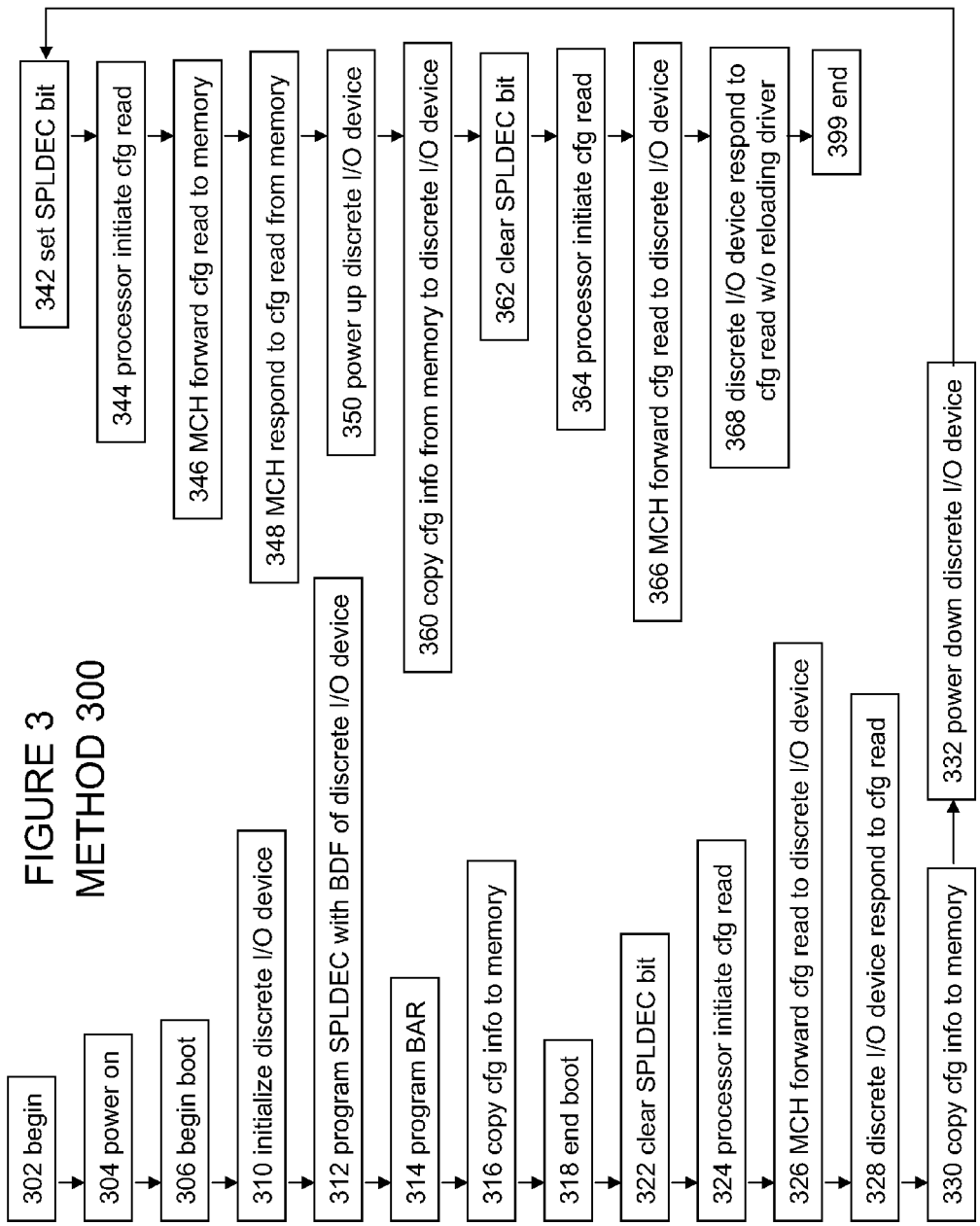
FIG. 3 illustrates a method for virtualizing an I/O device according to an embodiment of the present invention.
Figure 4:
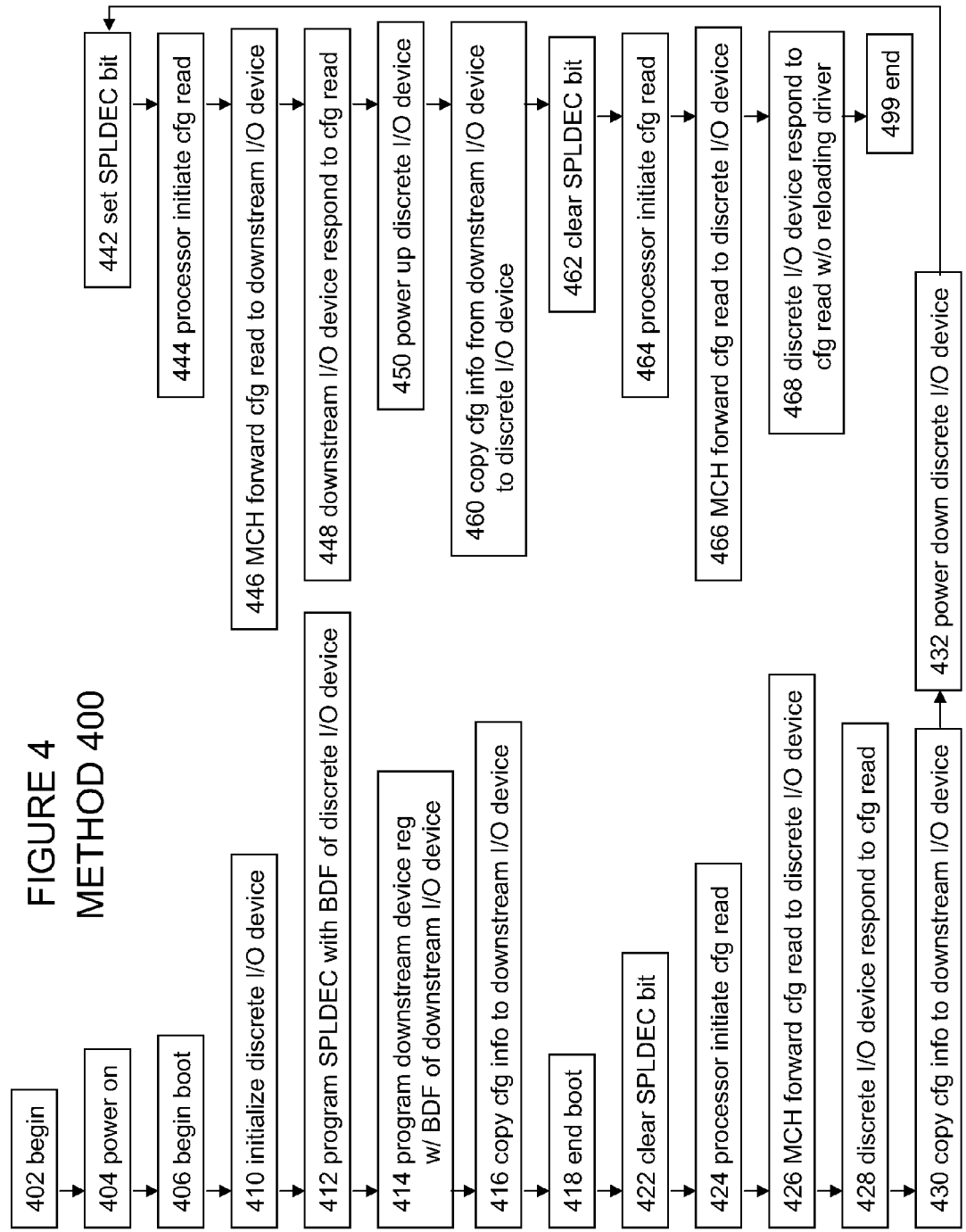
FIG. 4 illustrates a method for virtualizing an I/O device according to an embodiment of the present invention.
Figure 5:
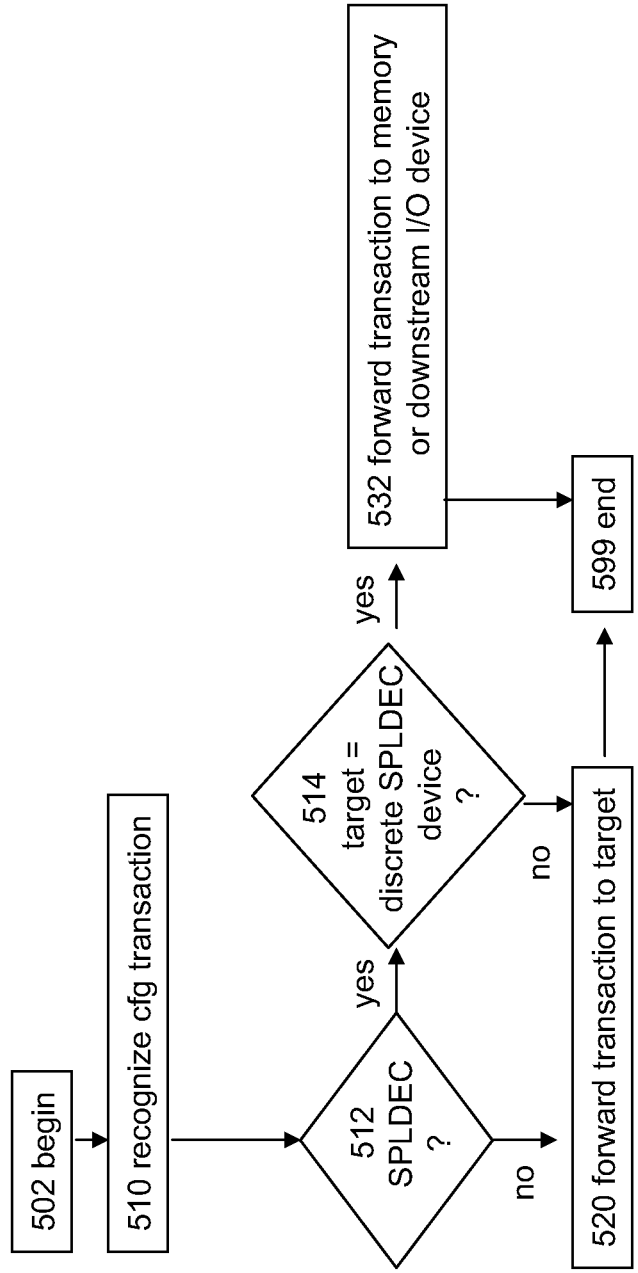
FIG. 5 illustrates a method for performing a special decode according to an embodiment of the present invention.

FIGS. 3, 4, and 5 illustrate embodiments of the present invention in a method, specifically methods 300 and 400 for virtualizing a powered-down I/O device, and method 500 for performing a special decode. In the following descriptions of methods 300, 400, and 500, references may be made to elements of FIGS. 1 and 2; however, method embodiments of the present invention are not limited in this respect.

In box 302 of FIG. 3, method 300 may begin. In box 304, an information processing system such as information processing system 100 may be turned from an off state to an on state, where an off state may include any type of powered down, suspend, or sleep state. Box 304 may include turning I/O device 160 from an off state to on state. In box 306, booting of information processing system 100 may begin. Booting may include the execution of boot code, basic input/output system ("BIOS") code, and/or other firmware or software, and a power-on self-test.

In box 310, an I/O device such as I/O device 160 may be discovered, assigned one or more BDFs, and configured, and its driver may be loaded into system memory 130. In box 312, the BDF of I/O device 160 may be stored in special decode device ID 214. In box 314, a value may be stored in BAR 216 to define the base address of memory region 132. In box 316, a copy of the PnP configuration space information for I/O device 160 may be stored in memory region 132. In box 318, booting may end.

In box 322, special decode bit 212 may be cleared, for example by system software such as BIOS. Note that box 322 may be omitted in an embodiment of the present invention wherein special decode bit 212 has a value of zero by default. Other embodiments of the present invention may also provide for other boxes to be omitted, rearranged, etc., as further described below.

In box 324, a transaction may be initiated to the PnP configuration space of I/O device 160. For example, in an embodiment including a PCI bus, a processor such as processor 110, running the Windows Vista operating system, may initiate a configuration read transaction to the PnP configuration space of I/O device 160 by writing the BDF of I/O device 160 to the I/O port at address "CF8" (hexadecimal). In box 326, MCH 140 may recognize this transaction to be a read to the PnP configuration space of I/O device 160, and convert it to a configuration read transaction on the PCI bus, directed to the PnP configuration space of I/O device 160. In box 328, I/O device 160 may respond to the transaction.

In box 330, the contents of the PnP configuration space of I/O device 160 may be stored in memory region 132, for example by system software, in anticipation of powering down I/O device 160. In box 332, I/O device 160 may be powered down or placed in an inaccessible state to reduce system power consumption or for any other reason. In a prior art information processing system, the effect of box 332 may be that on a PCI re-scan, no response is given to configuration read transactions to the PnP configuration space of I/O device 160, so the operating system would unload the driver for I/O device 160 from system memory 130. Therefore, when I/O device is repowered, the driver would have to be reloaded before I/O device 160 could be used. Embodiments of the present invention may be desired to avoid the delay required to reload a driver, re-balance memory, I/O, and interrupt resources, and restart the device (a "plug and play start") in this situation.

In box 342, special decode bit 212 may be set, for example by system software such as BIOS, in response to the powering down of I/O device 160. During the period of time when special decode bit 212 is set, software such as the driver for I/O device 160 may be responsible for ensuring that no I/O transactions are directed to I/O device 160.

In box 344, a transaction may be initiated to the PnP configuration space of I/O device 160. For example, in an embodiment including a PCI bus, a processor such as processor 110, running the Windows Vista operating system and performing a PCI re-scan, may initiate a configuration read transaction to the PnP configuration space of I/O device 160 by writing the BDF of I/O device 160 to the I/O port at address "CF8" (hexadecimal). In box 346, MCH 140 may recognize this transaction to be a read to the PnP configuration space of I/O device 160, and convert it to a memory read transaction directed to memory region 132. In box 348, MCH 140 may respond to the transaction using data from memory region 132, at the address specified by the base address from BAR 216 plus an offset from CF8 (hexadecimal). Therefore, MCH 140 pretends to the operating system that I/O device 160 is available, even though it is not, so the operating system will not unload the driver for I/O device 160.

In box 350, I/O device 160 may be powered on again. In box 360, the contents of memory region 132 may be copied to I/O device 160, for example by system software such as BIOS, to prevent the loss of any writes to the configuration space of I/O device 160 performed while I/O device 160 was powered down. Note that configuration write transactions directed to I/O device 160 while I/O device 160 is powered down may also be handled according to embodiments of the present invention, as described below.

In box 362, special decode bit 212 may be cleared, for example by system software such as BIOS, in response to the powering up of I/O device 160. In box 364, a transaction may be initiated to the PnP configuration space of I/O device 160. For example, in an embodiment including a PCI bus, a processor such as processor 110, running the Windows Vista operating system and performing a PCI re-scan, may initiate a configuration read transaction to the PnP configuration space of I/O device 160 by writing the BDF of I/O device 160 to the I/O port at address "CF8" (hexadecimal). In box 366, MCH 140 may recognize this transaction to be a read to the PnP configuration space of I/O device 160, and convert it to a configuration read transaction on the PCI bus, directed to the PnP configuration space of I/O device 160. In box 368, I/O device 160 may respond to the transaction without the delay of reloading its driver and a performing a plug and play start operation.

In box 399 of FIG. 3, method 300 may end.

In method 300, where MCH 130 recognizes transactions directed to the PnP configuration space of I/O device 160, such as in blocks 326, 346, and 366, MCH 130 may be performing a special decode as illustrated in FIG. 5 and described below.

Turning to FIG. 4, FIG. 4 illustrates an embodiment of the present invention in a method, specifically method 400 for virtualizing an I/O device.

In box 402 of FIG. 4, method 400 may begin. In box 404, an information processing system such as information processing system 100 may be turned from an off state to an on state, where an off state may include any type of powered down, suspend, or sleep state. Box 404 may include turning I/O device 160 from an off state to on state. In box 406, booting of information processing system 100 may begin. Booting may include the execution of boot code, basic input/output system ("BIOS") code, and/or other firmware or software, and a power-on self-test.

In box 410, an I/O device such as I/O device 160 may be discovered, assigned one or more BDFs, and configured, and its driver may be loaded into system memory 130. In box 412, the BDF of I/O device 160 may be stored in special decode device ID 214. In box 414, a value, such as a BDF, may be stored in downstream device storage location 218 to identify an I/O device, such as downstream I/O device 142, to which certain transactions to I/O device 160 may be redirected while I/O device 160 is powered down. In box 416, a copy of the PnP configuration space information for I/O device 160 may be stored in downstream I/O device 142. In box 418, booting may end.

In box 422, special decode bit 212 may be cleared, for example by system software such as BIOS. Note that box 422 may be omitted in an embodiment of the present invention wherein special decode bit 212 has a value of zero by default. Other embodiments of the present invention may also provide for other boxes to be omitted, rearranged, etc., as further described below.

In box 424, a transaction may be initiated to the PnP configuration space of I/O device 160. For example, in an embodiment including a PCI bus, a processor such as processor 110, running the Windows Vista operating system, may initiate a configuration read transaction to the PnP configuration space of I/O device 160 by writing the BDF of I/O device 160 to the I/O port at address "CF8" (hexadecimal). In box 426, MCH 140 may recognize this transaction to be a read to the PnP configuration space of I/O device 160, and convert it to a configuration read transaction on the PCI bus, directed to the PnP configuration space of I/O device 160. In box 428, I/O device 160 may respond to the transaction.

In box 430, the contents of the PnP configuration space of I/O device 160 may be stored in downstream I/O device 142, for example by system software, in anticipation of powering down I/O device 160. In box 432, I/O device 160 may be powered down or placed in an inaccessible state to reduce system power consumption or for any other reason. In a prior art information processing system, the effect of box 432 may be that on a PCI re-scan, no response is given to configuration read transactions to the PnP configuration space of I/O device 160, so the operating system would unload the driver for I/O device 160 from system memory 130. Therefore, when I/O device is repowered, the driver would have to be reloaded before I/O device 160 could be used. Embodiments of the present invention may be desired to avoid the delay required to reload a driver, re-balance memory, I/O, and interrupt resources, and restart the device (a "plug and play start") in this situation.

In box 442, special decode bit 212 may be set, for example by system software such as BIOS, in response the powering down of I/O device 160. During the period of time when special decode bit 212 is set, software such as the driver for I/O device 160 may be responsible for ensuring that no I/O transactions are directed to I/O device 160.

In box 444, a transaction may be initiated to the PnP configuration space of I/O device 160. For example, in an embodiment including a PCI bus, a processor such as processor 110, running the Windows Vista operating system and performing a PCI re-scan, may initiate a configuration read transaction to the PnP configuration space of I/O device 160 by writing the BDF of I/O device 160 to the I/O port at address "CF8" (hexadecimal). In box 446, MCH 140 may recognize this transaction to be a read to the PnP configuration space of I/O device 160, and convert it to a configuration read transaction on the PCI bus, directed to downstream I/O device 142. In box 428, downstream I/O device 142 may respond to the transaction. Therefore, downstream I/O device 142 pretends to the operating system that I/O device 160 is available, even though it is not, so the operating system will not unload the driver for I/O device 160.

In box 450, I/O device 160 may be powered on again. In box 460, the PnP configuration space of downstream I/O device 142 may be copied to I/O device 160, for example by system software such as BIOS, to prevent the loss of any writes to the configuration space of I/O device 160 performed while I/O device 160 was powered down. Note that configuration write transactions directed to I/O device 160 while I/O device 160 is powered down may also be handled according to embodiments of the present invention, as described below.

In box 462, special decode bit 212 may be cleared, for example by system software such as BIOS, in response to the powering up of I/O device 160. In box 464, a transaction may be initiated to the PnP configuration space of I/O device 160. For example, in an embodiment including a PCI bus, a processor such as processor 110, running the Windows Vista operating system and performing a PCI re-scan, may initiate a configuration read transaction to the PnP configuration space of I/O device 160 by writing the BDF of I/O device 160 to the I/O port at address "CF8" (hexadecimal). In box 466, MCH 140 may recognize this transaction to be a read to the PnP configuration space of I/O device 160, and convert it to a configuration read transaction on the PCI bus, directed to the PnP configuration space of I/O device 160. In box 468, I/O device 160 may respond to the transaction without the delay of reloading its driver and a performing a plug and play start operation.

In box 499 of FIG. 4, method 400 may end.

In method 400, where MCH 130 recognizes transactions directed to the PnP configuration space of I/O device 160, such as in blocks 426, 446, and 466, MCH 130 may be performing a special decode as illustrated in FIG. 5.

Turning to FIG. 5, FIG. 5 illustrates an embodiment of the present invention in a method, specifically method 500 for performing a special decode. In box 502, method 500 may begin.

In box 510, special decode logic 222 may recognize a transaction directed to the PnP configuration space of an I/O device (the "target" I/O device). In box 512, special decode logic 222 may determine whether special decode bit 212 is set. If special decode bit 212 is not set, then in box 520, the transaction is directed to the PnP configuration space of the target I/O device. However, if special decode bit 212 is set, then, in box 514, special decode logic 222 may determine whether the transaction is directed to the PnP configuration space of the I/O device identified by special decode device ID 514, for example, by comparing the BDF of the target I/O device to the BDF stored in special decode device ID 514. If the target BDF does not match the special decode device ID, then in box 520, the transaction is directed to the PnP configuration space of the target I/O device. However, if the target BDF matches the special decode device ID, then in box 530, the transaction is directed to memory region 132 or downstream I/O device 142.

In box 599 of FIG. 5, method 500 may end.

Within the scope of the present invention, the methods illustrated in FIGS. 3, 4, and 5 and/or the actions taken in performing methods 300, 400, and 500 may be performed together or separately, in a different order, with illustrated boxes omitted, with additional boxes added, or with a combination of reordered, omitted, or additional boxes. As one example, boxes 322 and 422 may be omitted in embodiments of the present invention wherein special decode bit 212 has a value of zero by default.

As an other example, embodiments of the present invention may provide for configuration write transactions directed to I/O device 160 while I/O device 160 is powered down to be handled similarly to the portions of methods 300 and 400 described above pertaining to configuration reads directed to I/O device 160, with the data to be written provided in a configuration write transaction to the I/O port at address "CF8" (hexadecimal), for example by processor 110. Embodiments of the present invention may also provide for memory read and write transactions directed to an I/O device 160, for example in the case of memory mapped I/O transactions, to be redirected to a memory region or a downstream I/O device.

Thus, embodiments of systems, apparatuses, and methods for virtualizing a powered-down I/O device have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
a first storage location, programmable to store a bus identifier, a device identifier, and a function identifier to identify an input/output device;
a second storage location in which to store an indication that the input/output device is inaccessible;
a third storage location in which to store a base address of a memory region;
a decoder to decode a configuration transaction directed to the input/output device; and
special decode logic to respond to an operating system as if the input/output device is accessible, to prevent the operating system from unloading a driver for the input/output device, by converting the configuration transaction to a memory transaction directed to the memory region if the contents of the second storage location indicate that the input/output device is inaccessible.

2. A method comprising:
programming a first programmable storage location with a bus identifier, a device identifier, and a function identifier to identify an input/output device;
copying the contents of a configuration space for the input/output device into a memory region;
receiving a first configuration transaction directed to the input/output device;
determining that the input/output device is unavailable by comparing an identifier of the target received in the first configuration transaction with the contents of the first programmable storage location;
responding as if the input/output device is available to prevent the operating system from unloading a driver for the input/output device;
finding a base address of the memory region in a second programmable storage location;
redirecting the first configuration transaction to the memory region; and
responding to the first configuration transaction using data from the memory region.

3. The method of claim 2, further comprising powering down the input/output device prior to receiving the first configuration transaction.

4. The method of claim 3, further comprising initiating the first configuration transaction prior to receiving the first configuration transaction, wherein initiating the first configuration transaction is performed as part of a re-scan operation to support a plug-and-play feature.

5. The method of claim 4, further comprising:
powering up the input/output device after redirecting the first configuration transaction;
receiving a second configuration transaction directed to the input/output device after powering up the input/output device; and
responding, by the input/output device, to the second configuration transaction without reloading the driver for the input/output device.

6. A system comprising:
an input/output device;
a processor to initiate a configuration transaction directed to the input/output device;
a first storage location, programmable to store a bus identifier, a device identifier, and a function identifier to identify an input/output device;
a second storage location in which to store an indication that the input/output device is inaccessible;
a third storage location in which to store a base address of a memory region;
a decoder to decode the configuration transaction; and
special decode logic to respond to an operating system as if the input/output device is accessible, to prevent the operating system from unloading a driver for the input/output device, by converting the configuration transaction to a memory transaction directed to the memory region if the contents of the second storage location indicate that the input/output device is inaccessible.

* * * * *